United States Patent
Nguyen (10) Patent No.: US 10,022,828 B2
(45) Date of Patent: Jul. 17, 2018

(54) ZERO-POINT FIXTURE

(71) Applicant: Mai Van Nguyen, Tomball, TX (US)

(72) Inventor: Mai Van Nguyen, Tomball, TX (US)

(*) Notice: Subject to any disclaimer, the term of this patent is extended or adjusted under 35 U.S.C. 154(b) by 394 days.

(21) Appl. No.: 14/952,392

(22) Filed: Nov. 25, 2015

(65) Prior Publication Data

US 2016/0375533 A1    Dec. 29, 2016

Related U.S. Application Data

(60) Provisional application No. 62/185,814, filed on Jun. 29, 2015.

(51) Int. Cl.
    *B23Q 3/00*      (2006.01)
    *B23Q 1/00*      (2006.01)
    *B23Q 3/10*      (2006.01)

(52) U.S. Cl.
    CPC ............ *B23Q 1/0072* (2013.01); *B23Q 3/103* (2013.01)

(58) Field of Classification Search
    USPC .......................................... 269/20, 309, 900
    See application file for complete search history.

(56) References Cited

U.S. PATENT DOCUMENTS

| | | | | | |
|---|---|---|---|---|---|
| 5,788,225 | A | * | 8/1998 | Iwata | B23Q 3/103 269/309 |
| 6,799,758 | B2 | * | 10/2004 | Fries | B23Q 1/0072 269/309 |
| 6,955,347 | B2 | * | 10/2005 | Kawakami | B23Q 1/0081 269/309 |
| 7,210,675 | B2 | * | 5/2007 | Montague | B23Q 7/1431 269/20 |
| 8,002,254 | B2 | * | 8/2011 | Bayer | B23Q 1/0018 269/20 |
| 8,448,931 | B2 | * | 5/2013 | Kitaura | B23Q 1/0063 269/309 |

* cited by examiner

*Primary Examiner* — Joseph J Hail
*Assistant Examiner* — Shantese McDonald (57) ABSTRACT

A zero-point fixture is a means for securing a component in place during machining. The fixture features a base plate that is placed onto a machining surface and a mounting plate to which the component may be attached. The mounting plate and the component are secured to the base plate by operatively engaging a plurality of retention knobs on the mounting plate into a plurality of pressurized clamps on the base plate. A plurality of mounting holes and a plurality of mounting channels allow the component to be mounted in a number of positions and orientations that may be reproduced for subsequent components to be machined. A plurality of risers serves to offset the component from the mounting plate while a plurality of elongated fasteners is inserted into the component to prevent movement of the component during machining.

19 Claims, 10 Drawing Sheets

ZERO-POINT FIXTURE

The current application claims a priority to the U.S. Provisional Patent application Ser. No. 62/185,814 filed on Jun. 29, 2015.

FIELD OF THE INVENTION

The present invention relates generally to a means for securing a component to a machining surface. More specifically, the present invention is a zero-point fixture for securing a component to a machining surface, reducing component setup times, and enabling reproducibility of component location on a machining surface across multiple components to be machined.

BACKGROUND OF THE INVENTION

Typically when machining a component, the component is secured to the machining surface in some manner in order to prevent the movement of the component during the machining process. This is generally accomplished utilizing a clamp or similar device to restrict the movement of the component and ensure accurate machining of the component. However, a disadvantage of conventional means of securing a component during machining is the fact that access to all surfaces of the component is limited due to the obstructive nature of the securing means (e.g. a clamp that positioned over the top of the component). The obstructive securing means results in additional setup time during the machining process as well. Additionally, the locations of multiple components on the machining surface cannot remain consistent, further increasing setup times in order to ensure accurate machining of the components.

The present invention is a zero-point fixture that facilitates securing a component to a machining surface. The present invention enables multiple components to be prepared for a particular computerized numerical control (CNC) machine while a component is already undergoing machining. This greatly reduces changeover time and increases the overall efficiency of the machining process for multiple components. The present invention additionally enables multiple components to be set up in the same location of a machining surface. This reproducibility of component location on a machining surface increases consistency and efficiency of the machining process. Finally, the present invention is not obstructive and allows access to all surfaces of a component during the machining process.

DETAIL DESCRIPTIONS OF THE INVENTION

All illustrations of the drawings are for the purpose of describing selected versions of the present invention and are not intended to limit the scope of the present invention.

The present invention is a zero-point fixture for securing a component to a machining surface. The present invention greatly reduces changeover time when machining multiple components. The present invention is shown in FIGS. 1-5 and comprises a base plate 1, a mounting plate 5, a plurality of pressurized clamps 10, and a plurality of retention knobs 15. The present invention additionally enables component location to be reproduced in the same location on a machining surface, increasing consistency and efficiency of the machining process.

With reference to FIGS. 1-5 and FIG. 6, the base plate 1 serves as an intermediary, elevating fixture between a machining surface and a component that is undergoing machining. The base plate 1 comprises a clamping surface 2 and a base surface 3. During usage of the present invention, the clamping surface 2 is oriented facing away from the machining surface while the base surface 3 is oriented facing toward the machining surface. The clamping surface 2 is the surface to which the mounting plate 5 is attached via the plurality of pressurized clamps 10 and the plurality of retention knobs 15. The plurality of pressurized clamps 10 is distributed about the clamping surface 2 to enable the plurality of pressurized clamps 10 to hold the mounting plate 5 in place while a component is being machined. The base surface 3 is the opposing surface to the clamping surface 2 and is positioned adjacent to the machining surface.

Figure 7:
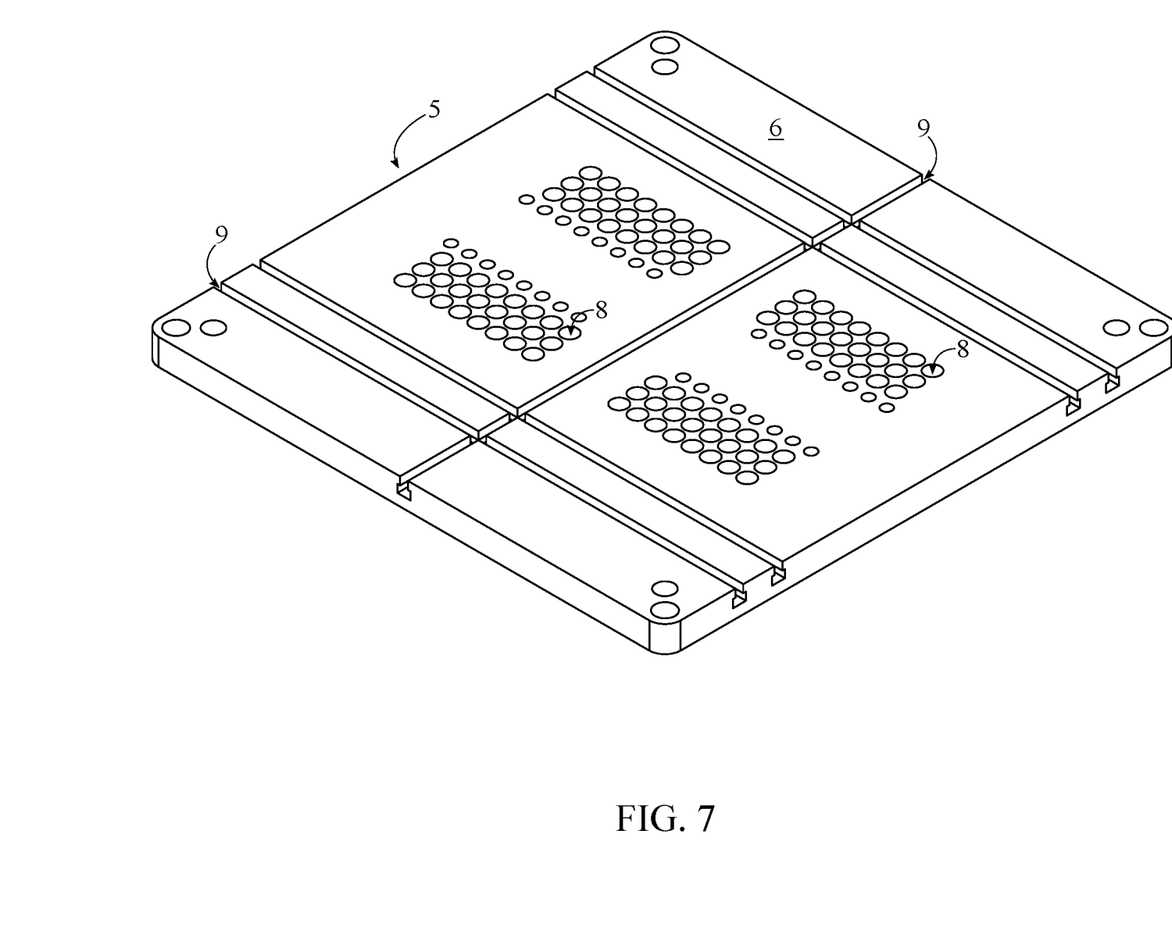
FIG. 7 is an elevated perspective view of the mounting plate.

With further reference to FIGS. 1-5 and with reference to FIG. 7, the mounting plate 5 is a plate onto which a component to be machined is fastened and serves as an intermediary between the base plate 1 and the component. The mounting plate 5 is then secured to the base plate 1 via the plurality of pressurized clamps 10 and the plurality of retention knobs 15. The plurality of pressurized clamps 10 and the plurality of retention knobs 15 ensure that the mounting plate 5 and the attached component do not separate from the base plate 1 during machining. Furthermore, the plurality of pressurized clamps 10 provide a surface onto which the mounting plate 5 may rest while remaining elevated above and offset from the base plate 1. The mounting plate 5 additionally allows for multiple components to be prepared for machining while a component is already undergoing machining. Each individual component may be fastened to an individual mounting plate 5, allowing another component to be immediately placed onto the base plate 1 to be machined after machining of the current component is complete. The mounting plate 5 comprises a mounting surface 6, a connecting surface 7, a plurality of mounting holes 8, and a plurality of mounting channels 9. The mounting surface 6 is the surface to which the component to be machined is mounted and is oriented facing away from the base plate 1. The connecting surface 7 is the opposing surface to the mounting surface 6 and is oriented facing toward the base plate 1.

Figure 2:
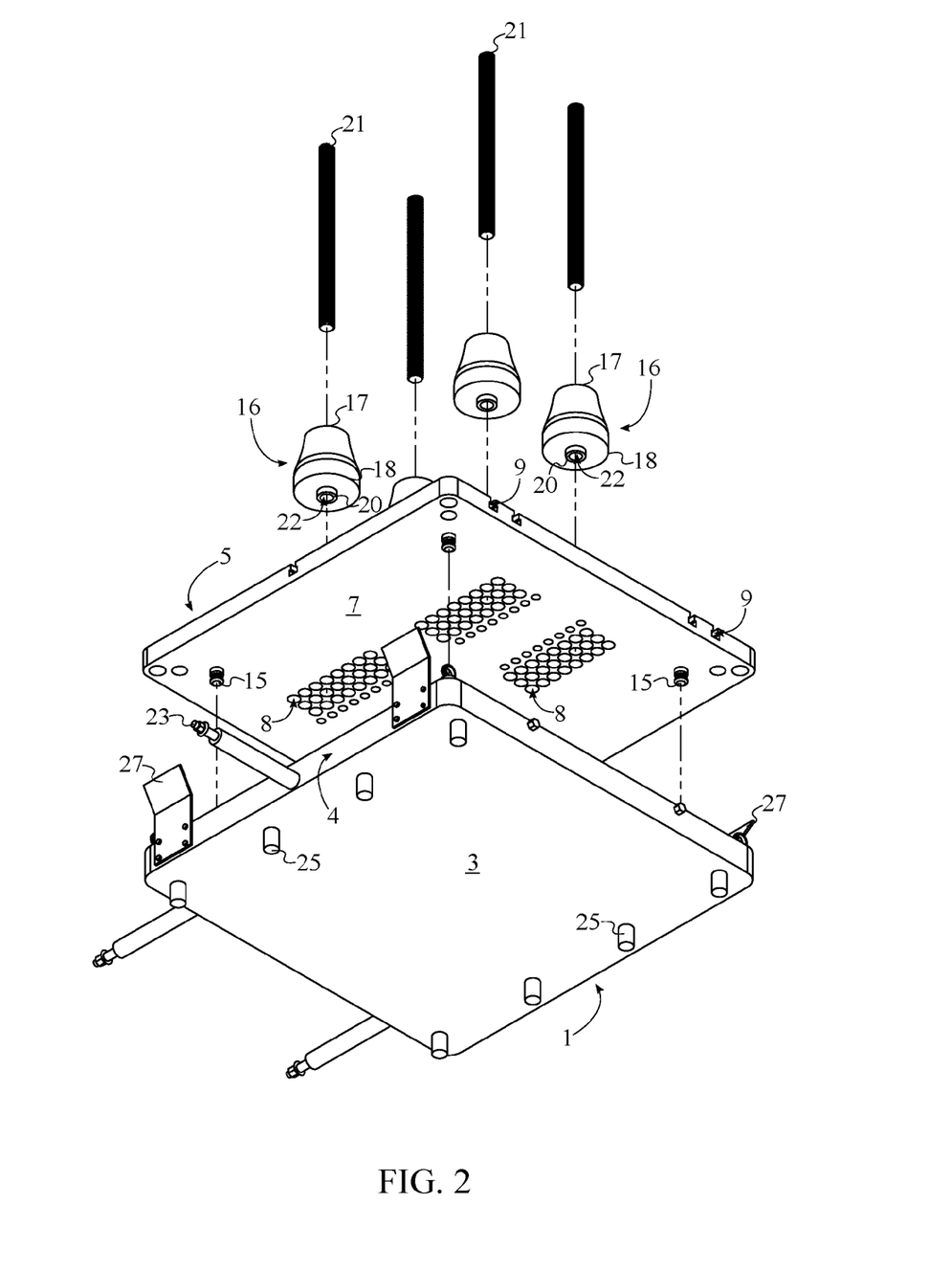
FIG. 2 is a lowered exploded perspective view of the present invention.
Figure 3:
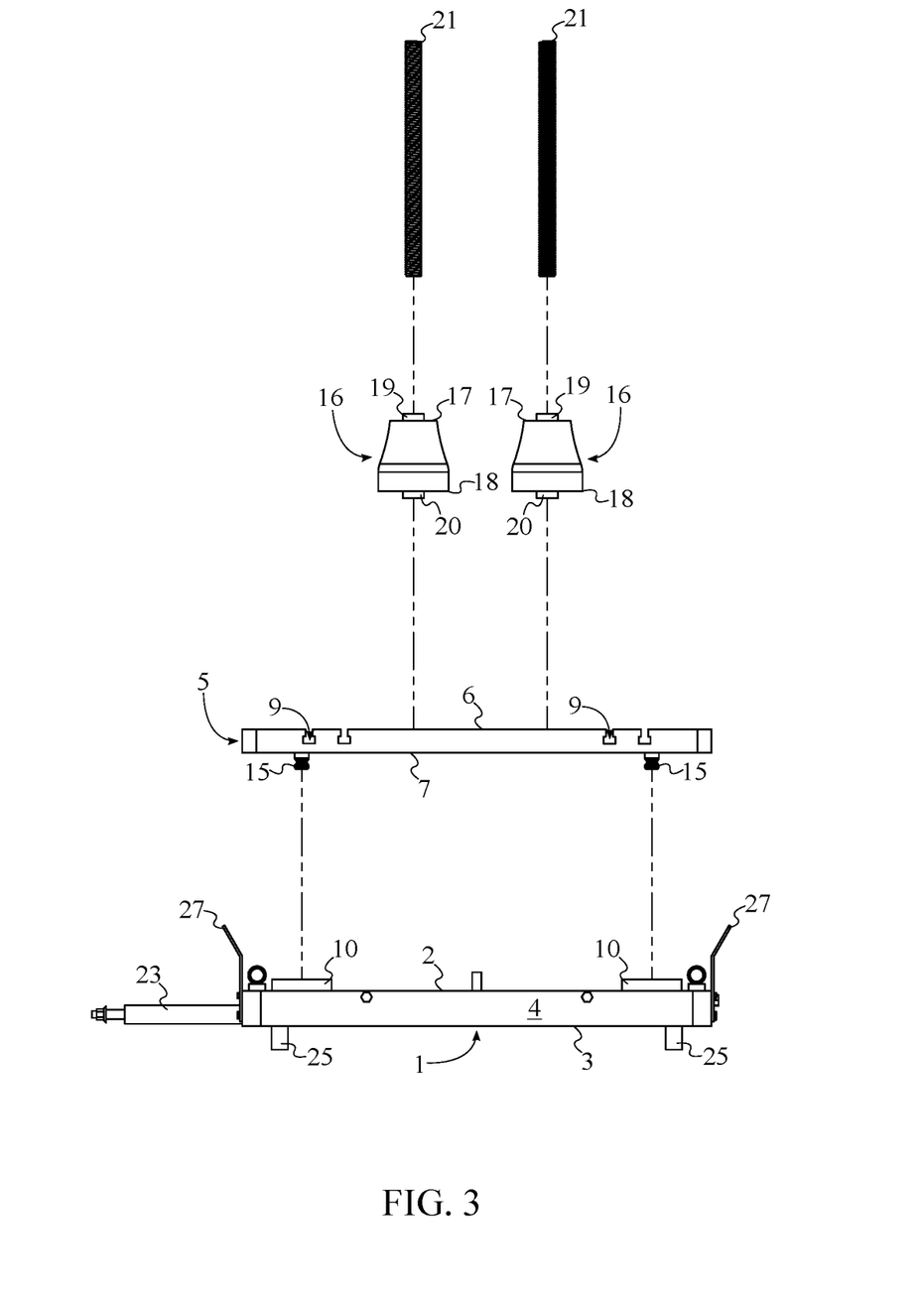
FIG. 3 is an exploded side view of the present invention.

With reference to FIG. 2 and FIG. 3, the plurality of retention knobs 15 protrudes from the connecting surface 7 and is able to interface with the plurality of pressurized clamps 10 to secure the mounting plate 5 to the base plate 1. Each of the plurality of retention knobs 15 is operatively engaged into a corresponding clamp from the plurality of pressurized clamps 10. The plurality of pressurized clamps 10 remains in a closed/clamped configuration during machining in the absence of a pressurized air stream. The mounting plate 5 may be easily removed from the base plate 1 by connecting a pressurized air stream to the plurality of pressurized clamps 10, placing the plurality of pressurized clamps 10 into an open/unclamped configuration.

Figure 1:
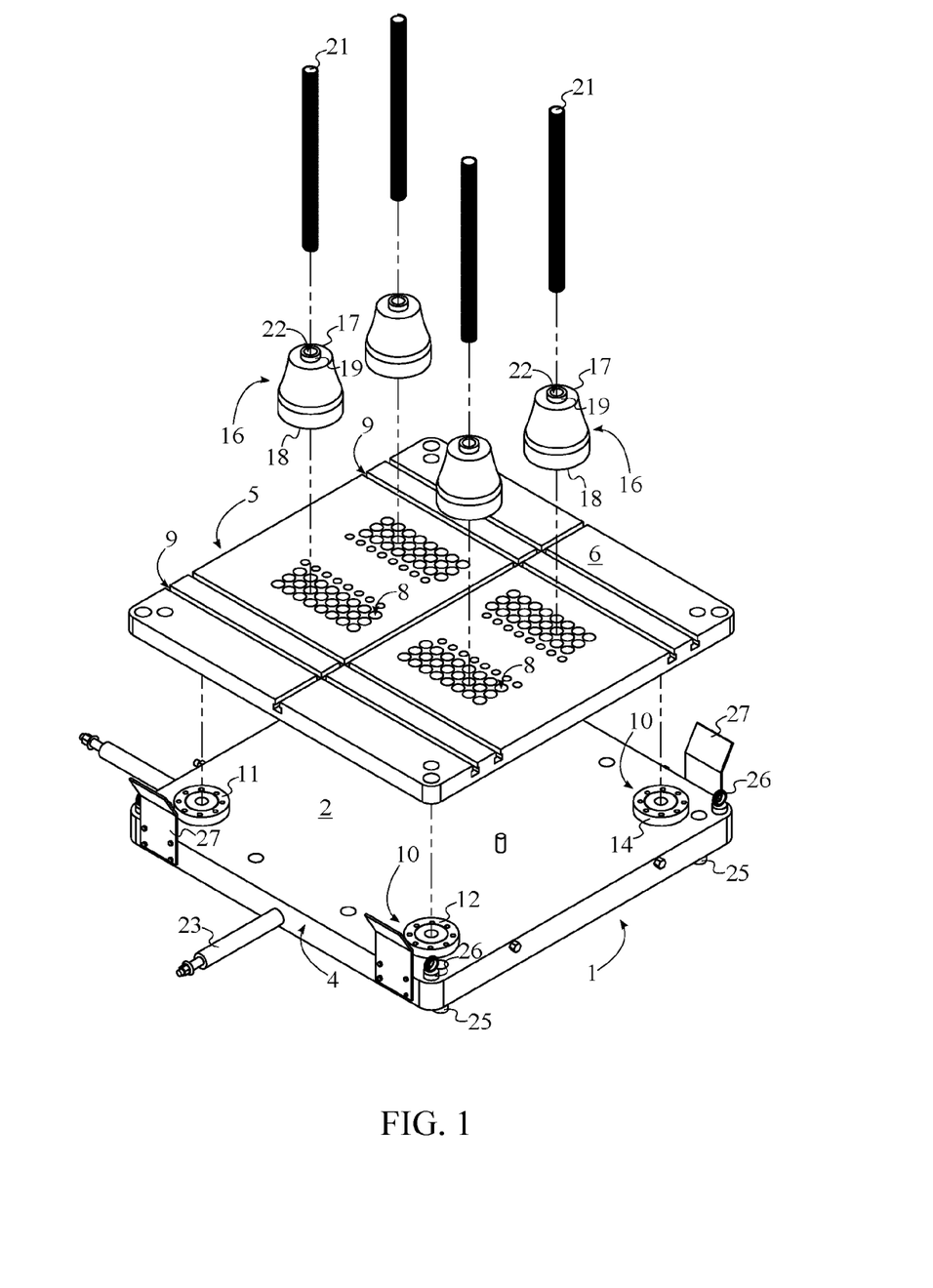
FIG. 1 is an elevated exploded perspective view of the present invention.
Figure 6:
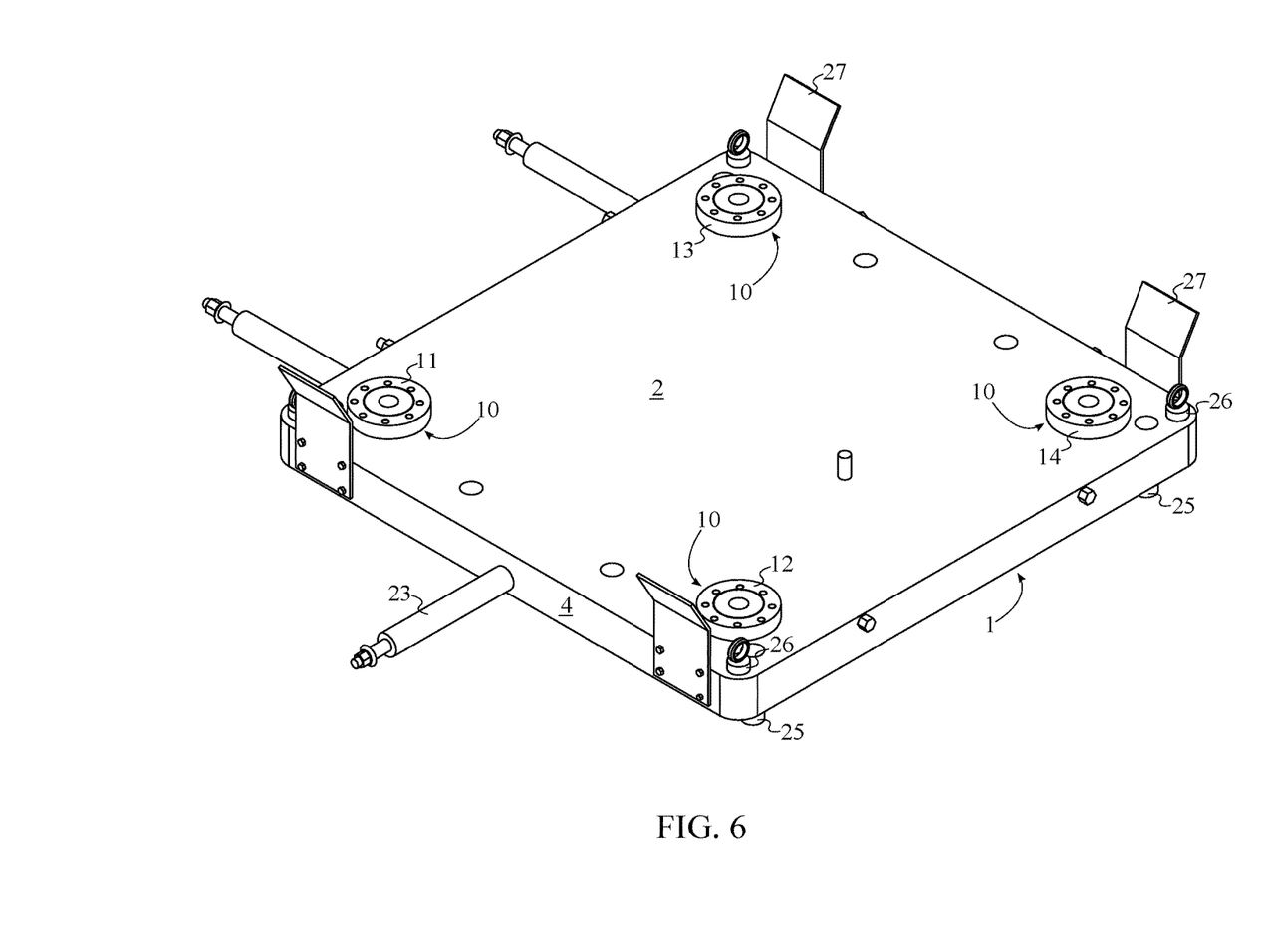
FIG. 6 is an elevated perspective view of the base plate.

While the present invention is not limited to a specific number for the plurality of pressurized clamps 10, in the preferred embodiment of the present invention, the plurality of pressurized clamps 10 comprises a first pressurized clamp 11, a second pressurized clamp 12, a third pressurized clamp 13, and a fourth pressurized clamp 14 as shown in FIG. 6. Furthermore, in the preferred embodiment of the present invention, the plurality of pressurized clamps 10 is a plurality of pneumatic clamps. Similar technology may be utilized as well for the plurality of pressurized clamps 10. The first pressurized clamp 11, the second pressurized clamp 12, the third pressurized clamp 13, and the fourth pressurized clamp 14 all function in an identical manner and are utilized to secure the mounting plate 5 and an attached component to the base plate 1. The first pressurized clamp 11 and the second pressurized clamp 12 are positioned opposite to the third pressurized clamp 13 and the fourth pressurized clamp 14 on the base plate 1. Similarly, the first pressurized clamp 11 and the third pressurized clamp 13 are positioned opposite to the second pressurized clamp 12 and the fourth pressurized clamp 14 on the base plate 1. As such, in the preferred embodiment of the present invention, the plurality of pressurized clamps 10 is organized into a square or rectangular arrangement in order to provide multiple points of securing the mounting plate 5 to the base plate 1. Other arrangements for the plurality of pressurized clamps 10 may be utilized in other embodiments of the present invention as necessary or as desired for various purposes. The plurality of pressurized clamps 10 is fixed in location on the base plate 1 to improve reproducibility of component location on a machining surface. As shown in FIG. 1 and FIG. 2, the plurality of retention knobs 15 is concentrically aligned with the plurality of pressurized clamps 10, enabling each of the plurality of retention knobs 15 to be operatively engaged into a corresponding clamp from the plurality of pressurized clamps 10.

Again with reference to FIGS. 1-5 and FIG. 7, the plurality of mounting holes 8 and the plurality of mounting channels 9 enable a component to be mounted to the mounting plate 5 in any position and configuration. The plurality of mounting holes 8 is distributed about the mounting plate 5 and is sufficiently numerous to enable for a wide variety of mounting positions and configurations. The plurality of mounting channels 9 is suitable for mounting a component to the mounting plate 5 that is not suitable for mounting via the plurality of mounting holes 8. The plurality of mounting holes 8 traverses through the mounting plate 5. This enables a plurality of elongated fasteners 21 to be positioned through the plurality of mounting holes 8 when mounting a component to the mounting plate 5. The plurality of mounting holes 8 is a plurality of hole groupings that is further organized into a plurality of rows and a plurality of columns. The plurality of rows and the plurality of columns are positioned in a manner such that the specific location of the mounted component on the mounting plate 5 may be customized prior to machining. The plurality of rows and the plurality of columns are additionally offset from the plurality of mounting channels 9 on the mounting plate 5. The plurality of mounting channels 9 traverses into the mounting surface 6, forming multiple elongated openings on the mounting surface 6. The plurality of mounting channels 9 may be utilized to secure a component to the mounting plate 5 by various means such as, but not limited to, tie down bars that may be slid into the plurality of mounting channels 9. In contrast to the plurality of mounting holes 8, the plurality of mounting channels 9 does not traverse entirely through the mounting plate 5, allowing various fastening means to be slid into and securely retained within the plurality of mounting channels 9.

Figure 4:
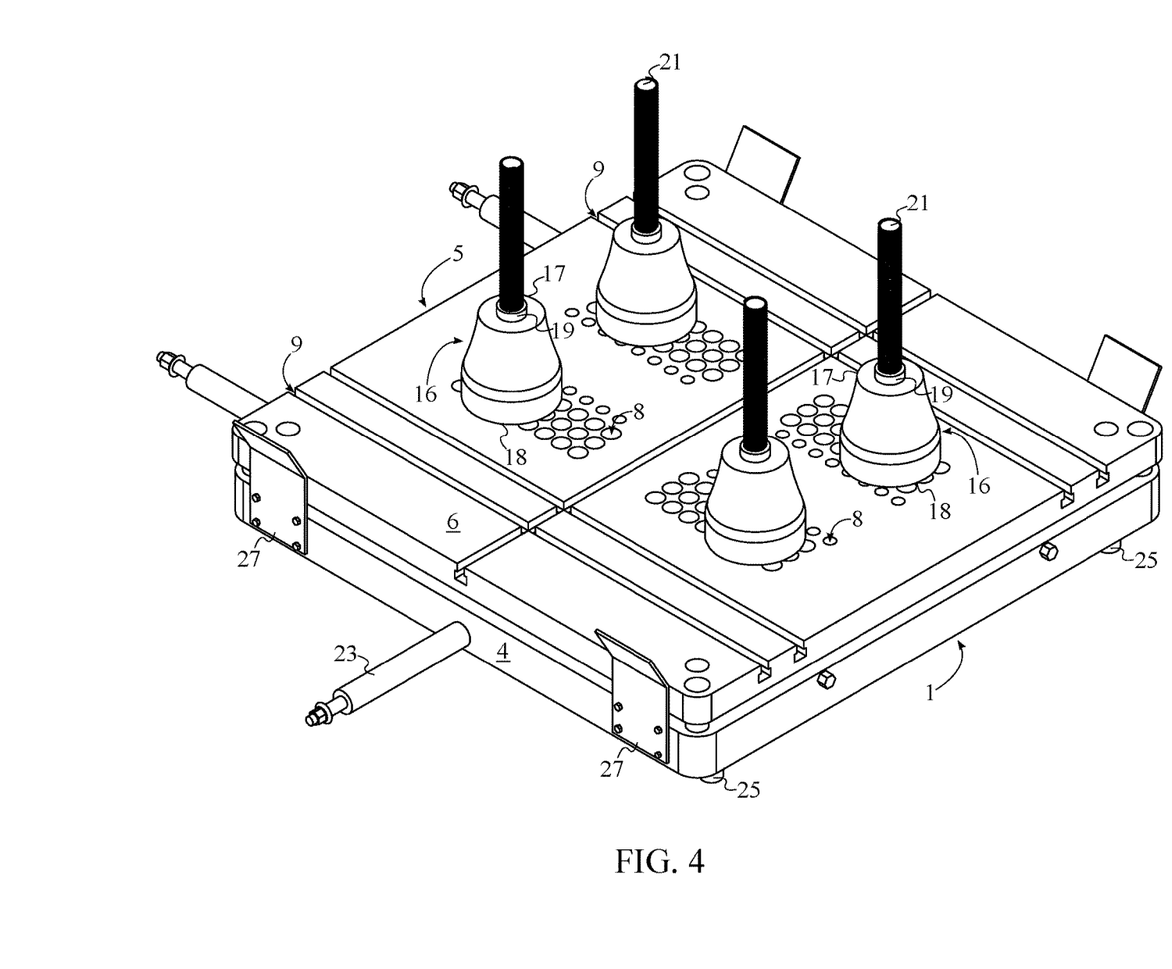
FIG. 4 is an elevated perspective view of the present invention.
Figure 5:
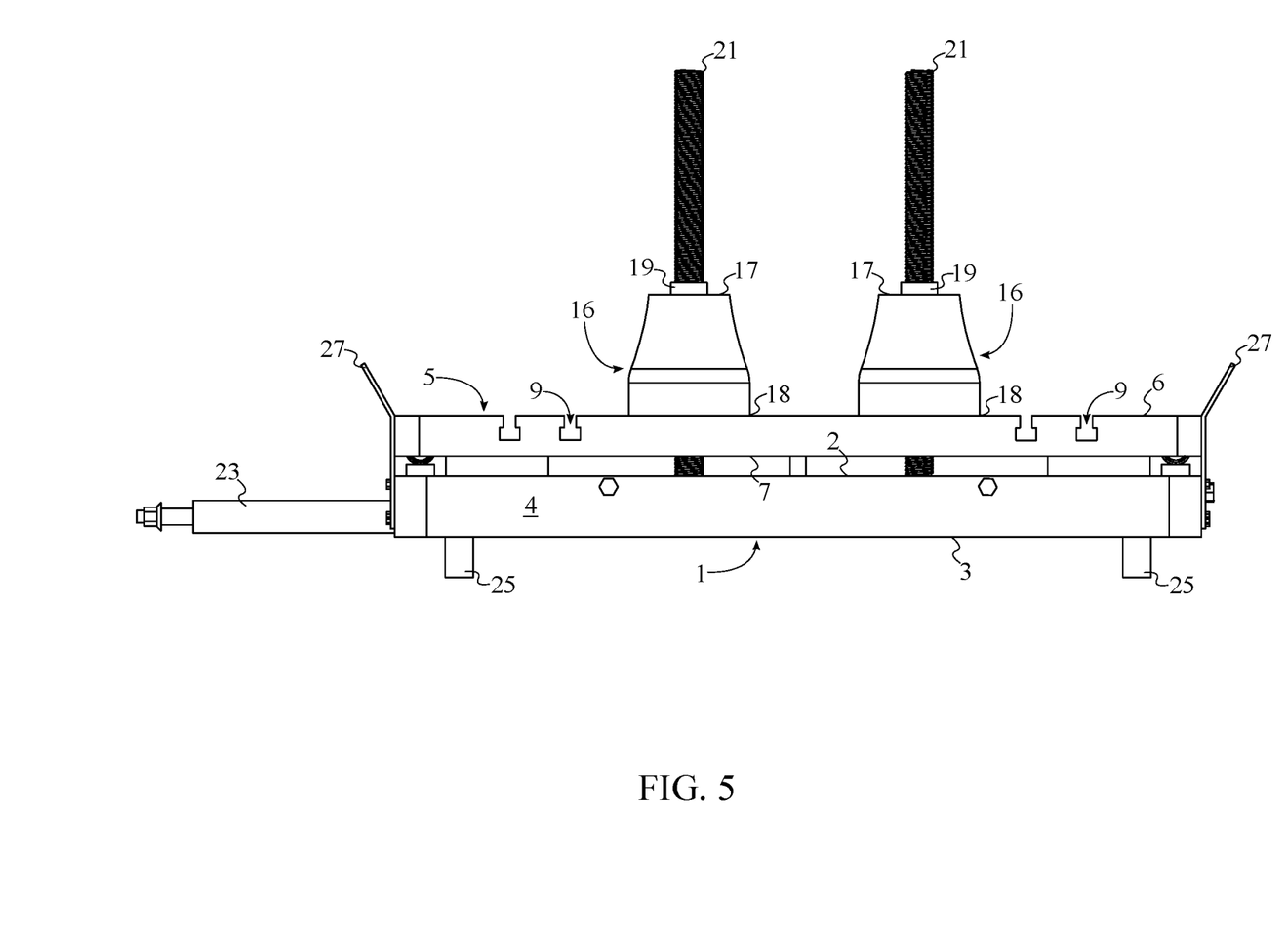
FIG. 5 is a side view of the present invention.
Figure 8:
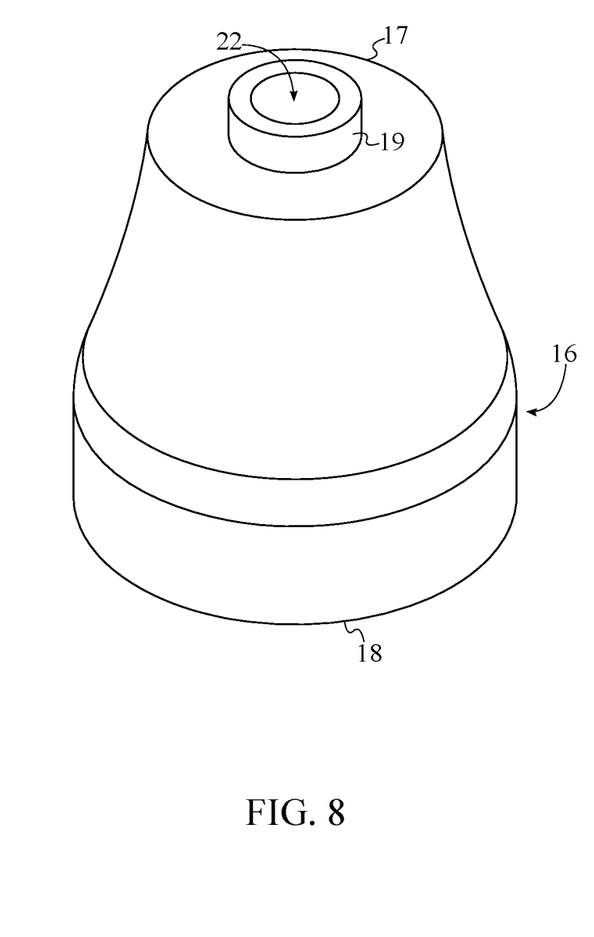
FIG. 8 is an elevated perspective view of a riser from the plurality of risers.
Figure 9:
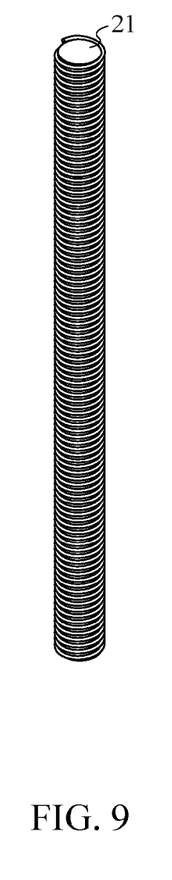
FIG. 9 is an elevated perspective view of a fastener from the plurality of elongated fasteners.

The present invention further comprises a plurality of risers 16 as shown in FIG. 8. As shown in FIGS. 1-5, the plurality of risers 16 and the plurality of elongated fasteners 21 are utilized to offset a component from the mounting plate 5 as well as to secure the component to the present invention during machining, respectively. In the preferred embodiment of the present invention, a number of holes corresponding to the number of the plurality of elongated fasteners 21 must be tapped into the component to be machined. The tapped holes are preferably located in a manner such that the tapped holes do not interfere with any integral features of the component. This enables the component to be secured onto the present invention by inserting the plurality of elongated fasteners 21 into the tapped holes. Each of the plurality of risers 16 is removably positioned into one of the plurality of mounting holes 8, securing the plurality of risers 16 in place on the mounting plate 5. The specific locations of each of the plurality of risers 16 may be customized based on the component to be machined. Each of the plurality of elongated fasteners 21 is concentrically positioned through a corresponding riser from the plurality of risers 16 as shown in FIG. 4 and FIG. 5. The plurality of elongated fasteners 21 is thus able to protrude from the plurality of risers 16 in order to offset the component from the mounting plate 5. In the preferred embodiment of the present invention, the plurality of elongated fasteners 21 is threaded and may be screwed into the plurality of risers 16.

With continued reference to FIGS. 1-5 and FIG. 8, the present invention further comprises a plurality of fastener channels 22 to accommodate the plurality of elongated fasteners 21. Each of the plurality of fastener channels 22 traverses axially through a corresponding riser from the plurality of risers 16. The plurality of elongated fasteners 21 may thus be inserted through the plurality of mounting holes 8 as well as the plurality of risers 16 through the plurality of fastener channels 22. Each of the plurality of elongated fasteners 21 is concentrically positioned into a corresponding channel from the plurality of fastener channels 22, allowing the plurality of elongated fasteners 21 to protrude from the plurality of risers 16 when the plurality of risers 16 is in place on the mounting plate 5. Each of the plurality of risers 16 comprises a first end 17, a second end 18, a first retention lip 19, and a second retention lip 20. The first end 17 and the second end 18 are simply opposing ends of each of the plurality of risers 16. Each of the plurality of fastener channels 22 traverses axially from the first end 17 to the second end 18 of a corresponding riser from the plurality of risers 16. Each of the plurality of fastener channels 22 thus traverses completely through a corresponding riser from the plurality of risers 16. The first retention lip 19 is able to be inserted into a corresponding tapped hole of the component to be machined to further secure the component to each of the plurality of risers 16. Similarly, the second retention lip 20 is able to be inserted into a corresponding hole from the plurality of mounting holes 8, further securing each of the plurality of risers 16 to the mounting plate 5. The first retention lip 19 is connected to the first end 17, concentric with a corresponding channel from the plurality of fastener channels 22 while the second retention lip 20 is connected to the second end 18, concentric with the corresponding channel from the plurality of fastener channels 22 as well. The first retention lip 19 and the second retention lip 20 thus do not interfere with the insertion of the plurality of elongated fasteners 21 through the plurality of fastener channels 22.

In the event that a rounded component must be machined utilizing the present invention, a plurality of V-blocks may be utilized in lieu of the plurality of risers 16. The plurality of V-blocks is able to form mounting surfaces for the curved surfaces of the rounded component. The rounded component may then be clamped in place on the plurality of V-blocks. Once the rounded component is secured to the plurality of V-blocks, the plurality of V-blocks may be rotated to adjust the position of the rounded component on the machining surface.

Figure 10:
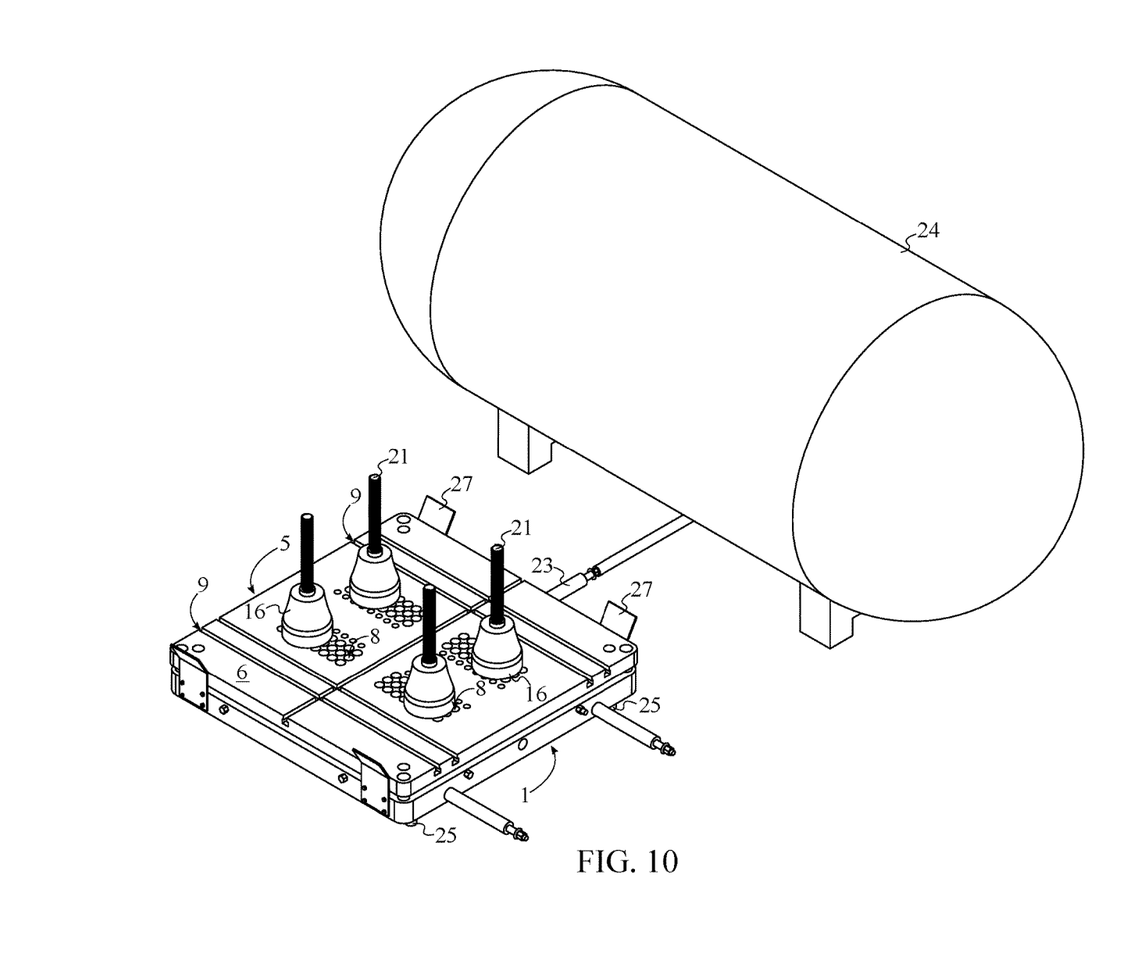
FIG. 10 is an elevated perspective view of the present invention attached to a compressed air vessel.

As shown in FIG. 10, the present invention further comprises at least one fluid conduit 23. In the preferred embodiment of the present invention, the at least one fluid conduit 23 is attached to a compressed air vessel 24, allowing compressed air to be supplied to the present invention. The at least one fluid conduit 23 is connected to a lateral face 4 of the base plate 1 and as such, the at least one fluid conduit 23 is kept physically away from the plurality of pressurized clamps 10. The at least one fluid conduit 23 is positioned in a manner such that the positioning of the at least one fluid conduit 23 does not interfere with the ability to secure the mounting plate 5 to the base plate 1. The compressed air vessel 24 is in fluid communication with the plurality of pressurized clamps 10 through the at least one fluid conduit 23. This allows the compressed air vessel 24 to supply the plurality of pressurized clamps 10 with compressed air. When flow of compressed air to the plurality of pressurized clamps 10 is enabled, the plurality of pressurized clamps 10 is disengaged, allowing the mounting plate 5 and the component to be removed from the base plate 1 by removing the plurality of retention knobs 15 from the plurality of pressurized clamps 10. The plurality of pressurized clamps 10 may be engaged by disabling flow of compressed air to the plurality of pressurized clamps 10 after the plurality of retention knobs 15 is operatively engaged into the plurality of pressurized clamps 10, securing the mounting plate 5 to the base plate 1.

As seen in FIG. 2, the present invention further comprises a plurality of stabilizing feet 25 that provide support to the base plate 1 when the base plate 1 is resting on the machining surface. The plurality of stabilizing feet 25 is distributed about the base surface 3 to provide multiple points of contact between the base plate 1 and the machining surface.

Again with reference to FIG. 6, the present invention further comprises a plurality of eyelet screws 26. The plurality of eyelet screws 26 aids in lifting and moving the base plate 1 by providing multiple grasping points on the base plate 1. Each of the plurality of eyelet screws 26 is mounted to the clamping surface 2, adjacent to a corresponding clamp from the plurality of pressurized clamps 10. The plurality of eyelet screws 26 is thus positioned in a manner such that multiple grasping points are present on the base surface 3 for more secure holding when lifting and transporting the base plate 1. The plurality of eyelet screws 26 is offset from the plurality of mounting holes 8 and the plurality of mounting channels 9. The plurality of eyelet screws 26 is thus positioned in a manner such that the plurality of eyelet screws 26 does not physically interfere with the plurality of mounting holes 8 and the plurality of mounting channels 9.

In order to aid in properly aligning the mounting plate 5 to the base plate 1, the present invention further comprises a plurality of guide tabs 27 as shown in FIGS. 1-6. The plurality of guide tabs 27 is connected to the lateral face 4 of the base plate 1 to prevent the plurality of guide tabs 27 from physically interfering when operatively engaging the mounting plate 5 to the base plate 1 while still allowing the plurality of guide tabs 27 to ensure that the mounting plate 5 and the base plate 1 are properly aligned.

The present invention offers significant advantages over conventional means of mounting a component to a machining surface. The mounting plate 5 enables multiple components to be prepared for machining by preparing each individual component on a corresponding individual mounting plate 5. As a result, changeover time is largely minimized as the next component is already prepared for machining when the machining of the current component is completed. The next component and the mounting plate 5 to which the component is attached may simply be secured onto the base plate 1 for machining. The plurality of mounting holes 8 and the plurality of mounting channels 9 allow for multiple components to be set up in the same location of a machining surface. The plurality of mounting holes 8 and the plurality of mounting channels 9 facilitate reproduction of component location on the machining surface for multiple components, thus increasing consistency and efficiency of the machining process. The reproducibility of component location on the machining surface additionally minimizes the likelihood of machining defects. The plurality of mounting holes 8 and the plurality of mounting channels 9 additionally allow components to be mounted in an unobstructed manner such that access to the surfaces of the components are not limited by the fastening means.

Although the present invention has been explained in relation to its preferred embodiment, it is understood that many other possible modifications and variations can be made without departing from the spirit and scope of the present invention as hereinafter claimed.

What is claimed is:
1. A zero-point fixture comprises:
   a base plate;
   a mounting plate;
   a plurality of pressurized clamps;
   a plurality of retention knobs;
   the base plate comprises a clamping surface and a base surface;
   the mounting plate comprises a mounting surface, a connecting surface, a plurality of mounting holes, and a plurality of mounting channels;
   the plurality of pressurized clamps being distributed about the clamping surface;
   each of the plurality of retention knobs being operatively engaged into a corresponding clamp from the plurality of pressurized clamps;
   the plurality of mounting holes being distributed about the mounting plate,
   the plurality of mounting holes traversing through the mounting plate;
   the plurality of mounting channels traversing into the mounting surface;
   a plurality of guide tabs; and
   the plurality of guide tabs being connected to a lateral face of the base plate.

2. The zero-point fixture as claimed in claim 1 further comprises:
the plurality of pressurized clamps comprises a first pressurized clamp, a second pressurized clamp, a third pressurized clamp, and a fourth pressurized clamp;
the first pressurized clamp and the second pressurized clamp being positioned opposite to the third pressurized clamp and the fourth pressurized clamp on the base plate; and
the first pressurized clamp and the third pressurized clamp being positioned opposite to the second pressurized clamp and the fourth pressurized clamp on the base plate.

3. The zero-point fixture as claimed in claim 1, wherein the plurality of retention knobs is concentrically aligned with the plurality of pressurized clamps.

4. The zero-point fixture as claimed in claim 1 further comprises:
the plurality of mounting holes being a plurality of hole groupings.

5. The zero-point fixture as claimed in claim 4, wherein the plurality of hole groupings is organized into a plurality of rows and a plurality of columns.

6. The zero-point fixture as claimed in claim 1 further comprises:
a plurality of risers;
a plurality of elongated fasteners;
each of the plurality of risers being removably positioned into one of the plurality of mounting holes; and
each of the plurality of elongated fasteners being concentrically positioned through a corresponding riser from the plurality of risers.

7. The zero-point fixture as claimed in claim 6 further comprises:
a plurality of fastener channels;
each of the plurality of fastener channels traversing axially through a corresponding riser from the plurality of risers; and
each of the plurality of elongated fasteners being concentrically positioned into a corresponding channel from the plurality of fastener channels.

8. The zero-point fixture as claimed in claim 6 further comprises:
a plurality of fastener channels;
each of the plurality of risers comprises a first end, a second end, a first retention lip, and a second retention lip;
each of the plurality of fastener channels traversing axially from the first end to the second end of a corresponding riser from the plurality of risers;
the first retention lip being connected to the first end, concentric with a corresponding channel from the plurality of fastener channels; and
the second retention lip being connected to the second end, concentric with the corresponding channel from the plurality of fastener channels.

9. The zero-point fixture as claimed in claim 1 further comprises:
at least one fluid conduit, wherein the at least one fluid conduit is attached to a compressed air vessel;
the at least one fluid conduit being connected to a lateral face of the base plate; and
the compressed air vessel being in fluid communication with the plurality of pressurized clamps through the at least one fluid conduit.

10. The zero-point fixture as claimed in claim 1 further comprises:
a plurality of stabilizing feet; and
the plurality of stabilizing feet being distributed about the base surface.

11. The zero-point fixture as claimed in claim 1 further comprises:
a plurality of eyelet screws;
each of the plurality of eyelet screws being mounted to the clamping surface, adjacent to a corresponding clamp from the plurality of pressurized clamps; and
the plurality of eyelet screws being offset from the plurality of mounting holes and the plurality of mounting channels.

12. A zero-point fixture comprises:
a base plate;
a mounting plate;
a plurality of pressurized clamps;
a plurality of retention knobs;
a plurality of risers;
a plurality of elongated fasteners;
a plurality of fastener channels;
a plurality of guide tabs;
the base plate comprises a clamping surface and a base surface;
the mounting plate comprises a mounting surface, a connecting surface, a plurality of mounting holes, and a plurality of mounting channels;
each of the plurality of risers comprises a first end, a second end, a first retention lip, and a second retention lip;
the plurality of pressurized clamps being distributed about the clamping surface;
each of the plurality of retention knobs being operatively engaged into a corresponding clamp from the plurality of pressurized clamps;
the plurality of mounting holes being distributed about the mounting plate,
the plurality of mounting holes traversing through the mounting plate;
the plurality of mounting channels traversing into the mounting surface;
each of the plurality of risers being removably positioned into one of the plurality of mounting holes;
each of the plurality of elongated fasteners being concentrically positioned through a corresponding riser from the plurality of risers;
each of the plurality of fastener channels traversing axially through a corresponding riser from the plurality of risers;
each of the plurality of elongated fasteners being concentrically positioned into a corresponding channel from the plurality of fastener channels;
each of the plurality of fastener channels traversing axially from the first end to the second end of a corresponding riser from the plurality of risers;
the first retention lip being connected to the first end, concentric with a corresponding channel from the plurality of fastener channels;
the second retention lip being connected to the second end, concentric with the corresponding channel from the plurality of fastener channels; and
the plurality of guide tabs being connected to a lateral face of the base plate.

13. The zero-point fixture as claimed in claim 12 further comprises:
the plurality of pressurized clamps comprises a first pressurized clamp, a second pressurized clamp, a third pressurized clamp, and a fourth pressurized clamp;

the first pressurized clamp and the second pressurized clamp being positioned opposite to the third pressurized clamp and the fourth pressurized clamp on the base plate; and the first pressurized clamp and the third pressurized clamp being positioned opposite to the second pressurized clamp and the fourth pressurized clamp on the base plate.

14. The zero-point fixture as claimed in claim 12, wherein the plurality of retention knobs is concentrically aligned with the plurality of pressurized clamps.

15. The zero-point fixture as claimed in claim 12 further comprises:

the plurality of mounting holes being a plurality of hole groupings.

16. The zero-point fixture as claimed in claim 15, wherein the plurality of hole groupings is organized into a plurality of rows and a plurality of columns.

17. The zero-point fixture as claimed in claim 12 further comprises:

at least one fluid conduit, wherein the at least one fluid conduit is attached to a compressed air vessel;

the at least one fluid conduit being connected to a lateral face of the base plate; and the compressed air vessel being in fluid communication with the plurality of pressurized clamps through the at least one fluid conduit.

18. The zero-point fixture as claimed in claim 12 further comprises:

a plurality of stabilizing feet; and the plurality of stabilizing feet being distributed about the base surface.

19. The zero-point fixture as claimed in claim 12 further comprises:

a plurality of eyelet screws;

each of the plurality of eyelet screws being mounted to the clamping surface, adjacent to a corresponding clamp from the plurality of pressurized clamps; and the plurality of eyelet screws being offset from the plurality of mounting holes and the plurality of mounting channels.

* * * * *